Jan. 30, 1968   J. SELIBER   3,365,912

FLUID COUPLING AND MOUNTING MEANS THEREFOR

Filed Feb. 11, 1966

INVENTOR
JOSEPH SELIBER
BY Edward R. Lowndes

United States Patent Office 3,365,912
Patented Jan. 30, 1968

3,365,912
FLUID COUPLING AND MOUNTING
MEANS THEREFOR
Joseph Seliber, 313 Hibbard Road,
Wilmette, Ill. 60691
Filed Feb. 11, 1966, Ser. No. 526,737
3 Claims. (Cl. 64—4)

ABSTRACT OF THE DISCLOSURE

A mounting means for a fluid coupling whereby the same may be operatively connected to either a driving component, a driven component, or both. The mounting means is in the form of a shell having a mounting plate at one end and a mounting flange at the other, the plate and flange having male and female face characteristics whereby the same may be attached to counterpart components associated with the driven and driving components respectively and without the use of adapters.

---

The present invention relates to fluid couplings and has particular reference to a novel mounting means for a fluid coupling whereby the same may be quickly and operatively applied to a driving component in driven relationship with respect thereto, and also to a driven component in driving relationship, the components involved being commercially available components and the mounting means being such that no adapter devices are necessary to effect the connection and no modification of the housings associated with the components nor of the gearing or shafting associated therewith are required. The invention is particularly useful in connection with the coupling of an electric motor to a gear reduction device by way of the fluid coupling which is interposed therebetween and which, when so interposed, performs its usual torque-transmitting functions effectively, and the invention has been thus illustrated for exemplary purposes.

One of the principal advantages offered by the present invention is the provision of a three-unit assembly such as has briefly been outlined above and wherein the electric motor is not subject to misalignment factors arising from its connection to the same base frame or foundation support as that of the remotely positioned driven component or gear reduction device. Electric motors are commonly bolted in position directly on a driven component by mating piloting flanges and supported from such component as for example the electric starting motor of an automotive vehicle. However, where the driven component is to be indirectly driven from a remote electric motor through a fluid coupling, the latter, being bodily rotatable, precludes the use of direct pilot connections between the fluid coupling and either the driving or the driven component. Thus, to overcome this limitation and still retain the necessary alignment of shafts as heretofore described, the housing and fluid coupling assembly of the present invention serves to support the electric motor in a free floating condition so that any thermal expansion or contraction of the motor frame or other distortion which may occur, is assimilated or adjusted in the frame itself and has little or no effect on shaft alignment.

A further and important advantage of the present invention resides in the provision of facilities whereby components having standardized mounting facilities, specifically NEMA mounting plates or flanges, may be used interchangeably with the fluid coupling and housing assembly. For example, on the end of the housing which carries the female C-flange mounting it is possible to mount any one of a wide variety of commercially available electric motors having end faces which are provided with male C-flange mounting plates and when such a motor is thus mounted, no thought need be given to shaft alignment since proper alignment takes place automatically as soon as the bolting connections are made. Similarly, on the end of the housing which carries the male C-flange mounting it is possible to mount any one of numerous commercially available driven components such as magnetic brakes, gear reduction units or other drives, providing such components are equipped with the proper standardized female C-face mounting plates or flanges. Again, no thought need be given to proper shaft alignment which likewise takes place automatically when the bolting connections are completed.

A related advantage of the invention follows from the use of male and female C-face mounting facilities on the housing of the fluid coupling, this advantage residing in the amount of labor which is saved due to the fact that prefabrication of mounting parts is not required. The labor which is saved is skilled labor inasmuch as to properly fit and align an electric motor with a driven component which is spaced therefrom for the purpose of permitting interpositioning of a fluid coupling requires considerable fabrication, often involving special machining and final shimming operations, to say nothing of the cost of parts and materials.

Another advantage of the present invention is the establishment of a more rigid connection between the driving and the driven components of the three-unit assembly than has heretofore been possible, with all mountings being kept close to the hub portions of both the motor frame and the frame or casing of the gear reduction device.

Still another advantage resides in the fact that the tubular housing for the fluid coupling constitutes, in effect, a non-yieldable spacer member by means of which the electric motor and gear reduction unit are rigidly connected together in their spaced relationship but with almost the same rigidity and effect that would be attained if the mating C-face flanges thereof were directly bolted to each other. Although separated by a distance equal to that necessary for proper and effective interpositioning of the fluid coupling therebetween, the motor and gear reduction device are rigidly connected together by a tubular column of metal which maintains the hub portions of these spaced apart components in precise axial alignment at all times and which is free to elongate and shorten under thermal influences because of the free floating condition of the electric motor and the absence of any binding influences thereon. Finally, the fact that the aforementioned tubular column of metal which rigidly connects the motor and gear reduction frames also constitutes an enclosure for the rotating fluid coupling, affords protection for the fluid coupling, as well as for personnel in the vicinity of the installation.

Numerous other objects and advantages of the invention, not at this time enumerated, will become readily apparent as the following description ensues.

In the accompanying single sheet of drawings forming a part of this specification, one illustrative embodiment of the invention has been shown by way of example rather than by way of limitation.

Figure 1:
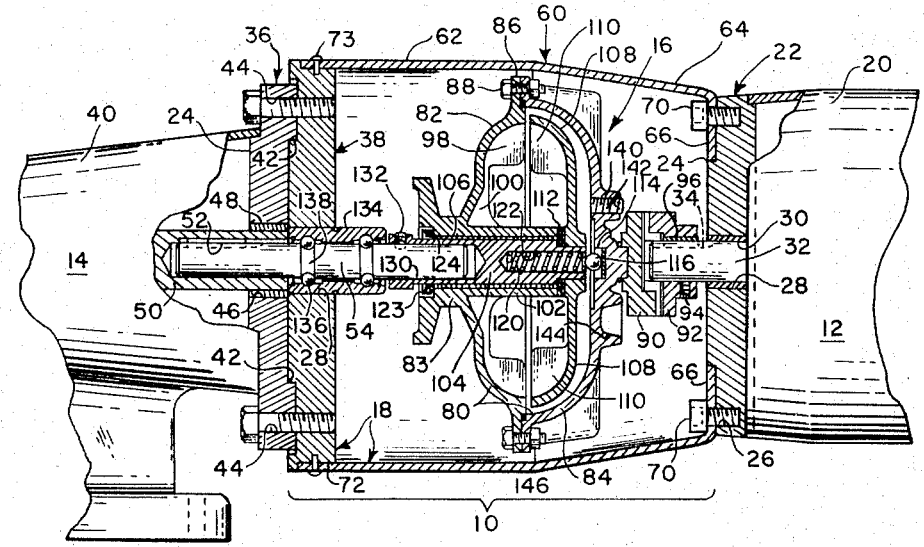
FIG. 1 is a fragmentary sectional view taken substantially centrally and longitudinally through a fluid coupling and housing assembly embodying the principles of the present invention and showing the same operatively installed between an electric motor and gear reduction device.
Figure 2:
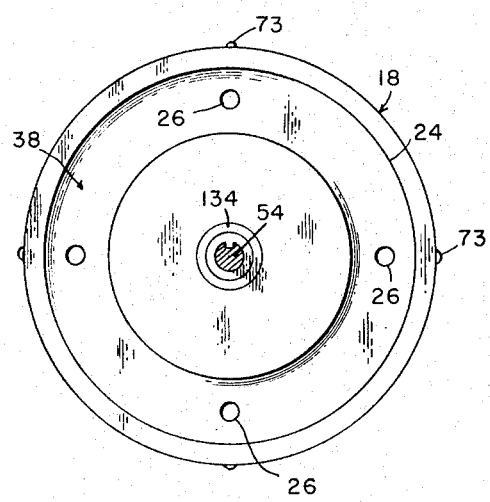
FIG. 2 is an end view of the detached fluid coupling and housing assembly looking from the output side thereof.

Referring now to the drawings in detail and in particular to FIG. 1, the fluid coupling and housing assembly of the present invention has been designated in its entirety at 10 and it is shown as being operatively installed between an electric motor 12 and a gear reduction device or unit 14. The assembly 10 includes a fluid coupling proper 16 and a combined housing and mounting frame 18 for the fluid coupling whereby the latter may selectively be operatively applied to various commercially available components, either in driving or driven relationship or both. For exemplary purposes herein the motor 12 and gear reduction device 14 have been selected as typical driving and driven components respectively and, as will be apparent presently, the combined housing and mounting frame affords a novel means whereby the fluid coupling 16 may be operatively connected to these two components to provide an assembly of parts which affords a rigidity and degree of coaxial shaft alignment that is more conducive to a vibrationless and trouble-free assembly than has heretofore been possible when the motor and gear reduction unit are mounted on a common base support with the fluid coupling being freely suspended between the two other components.

Both the motor 12 and the gear reduction unit 14, as well as the fluid coupling 16 are of conventional design and no claim is made herein to any novelty associated with the same, the novelty of the present invention residing rather in the mounting means for the fluid coupling whereby it may be operatively applied to the motor and gear reduction device, and also residing in the novel combination of the fluid coupling and its mounting means, the combination constituting a salable package-type unit having wide utility in many installations where its torque-transmitting properties are required.

The electric motor 12 is provided with the usual outer shell 20 which carries at its forward end a conventional mounting plate or flange 22 consisting of a relatively thick circular plate having a large diameter shallow pilot boss 24 formed on its forward or outside face. A series of four equally and circumferentially spaced bolt holes 26 in the peripheral regions of the plate lie outside the pilot boss 24. A central opening or hole 28 receives therein a bushing 30 which surrounds the output or drive shaft 32 of the motor 12, the shaft projecting forwardly of the plate and being provided with a keyway 34.

The mounting flange 22 just described is conventional. Specifically it conforms to National Electrical Manufacturers standards for electric motor mountings and it is commonly known as a C-flange or C-face mounting. The mounting plate or flange 22 may be regarded as a male mounting flange and it is designed for mating cooperation with a female counterpart which likewise is referred to as a C-flange, such flanges being commonly employed on numerous commercial components such as magnetic brakes, gear reduction devices and other equipment whereby the latter may be bolted directly to the C-face of the motor after the output shaft of the motor has been connected to the input shaft of the particular component involved in driving relationship. Such a female C-flange in the form of an end plate 36 is associated with the gear reduction unit 14 and it is capable of being bolted directly to the mounting flange or plate 22 but, in the assembly of FIG. 1, it remains spaced from such plate and, instead, is bolted to a mounting plate 38 associated with the housing 18, all in a manner and for a purpose that will be made clear presently.

The gear reduction unit 14 is provided with an outer casing 40 which carries at its rear end the previously mentioned mounting plate 36 and the latter consists of a relatively thick circular plate having a pilot recess 42 formed in the rear side thereof and conformable in diameter to the diameter of the pilot boss 24 of the mounting plate 22. Bolt holes 44 which conform in number and disposition to the number and disposition of the bolt holes 26 in the plate 22 are formed in the plate 36. A central opening 46 is provided in the plate 36 and receives therein a bushing 48 which surrounds the input shaft 50 of the device 14. This input shaft 50 is formed with a relatively deep socket 52 therein for reception of a suitable driving member or shaft which, in the present installation is in the form of a shaft 54 associated with the fluid coupling 16 in a manner that will be made clear when the nature of the coupling and its housing 18 is set forth.

Figure 3:
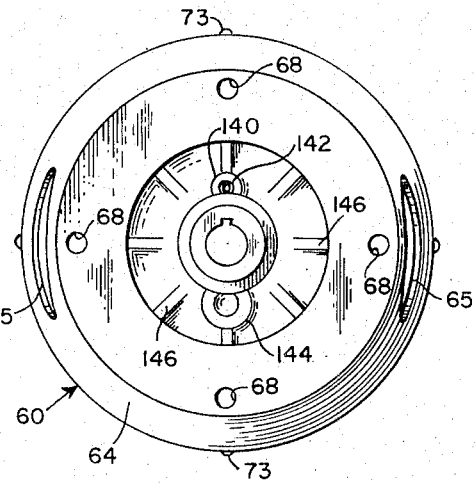
FIG. 3 is an end view of the detached assembly looking from the input side thereof.

Referring now to all views of the drawings, the combined housing and mounting frame 18 for the fluid coupling 16 involves in its general organization a generally cylindrical open-ended outer shell 60 having a forward truly cylindrical section 62 and a rear section 64 which tapers on a slight slant angle and which is formed with venting openings 65 therein. The rear rim of the shell 60 is formed with an inturned mounting flange 66 having bolt holes 68 therein (FIG. 3) conforming in number and disposition to the bolt holes 26 in the mounting plate 22. Clamping bolts 70 project through the holes 68 and are threadedly received in the bolt holes 26, thereby serving to securely clamp the rear end of the shell 60 to the front mounting plate 22 of the electric motor 12. The inner periphery of the inturned mounting flange 66 is of a diameter equal to the diameter of the pilot boss 24 and thus the flange 66 seats upon the annulus and fills the recess which is formed by reason of the pilot boss 24 and the latter projects into the central opening which is afforded by the inturned flange 66. This latter flange thus, in effect, constitutes a female C-flange which is a counterpart of the standardized male mounting plate or flange 22.

The forward open rim of the shell 60 is telescopically received over the previously mentioned mounting plate 38, fits within a peripheral recess 72 formed therein, and is secured in position by screws 73. The mounting plate 38 is substantially identical with the mounting plate 22 on the electric motor 12 and, therefore, in order to avoid needless repetition of description, identical reference characters have been applied to the corresponding parts as between the two plates 22 and 38.

The fluid coupling proper 16 includes a casing 80 which is formed in two sections 82 and 84 respectively, the sections being generally cup-shaped in configuration and being provided with mating bolting flanges 86 at their peripheries which are secured together by clamping bolt and nut assemblies 88. The casing section 84 has welded thereto one section 90 of a two-part coupling assembly and the other mating section 92 of the assembly is secured by a set screw 94 to the motor drive shaft 32 and is further held against relative rotation on the shaft by a key 96 which is disposed in the keyway 34. The casing 80 thus rotates in unison with the drive shaft 32 and constitutes the impeller of the fluid coupling. The section 82 is formed with a front hub portion 83 and with the usual series of radially disposed impeller vanes 98 which are connected by narrow webs 100 to an elongated axially extending hub 102 which is integrally formed as a part of the casing section 82.

The hub 102 extends rearwardly within the casing 80 and terminates short of the casing section 84. A central axial turbine shaft 104 projects axially through the hub 102 and a sleeve bearing 106 is interposed between the hub and shaft. The rear end of the shaft 104 projects rearwardly beyond the hub 102 and carries the usual turbine member 108, the latter being provided with a series of radial vanes 110 which oppose the vanes 98 in fluid exchange relationship. A pair of thrust washers 112 is interposed between the rear end face of the hub 102 and the turbine member 108. The casing section 84 is formed with a central internal socket or recess 114 within which there is seated a hardened steel thrust plate 116. A ball 118 bears against the thrust plate 116 and a spring 120 has one end bearing against the ball and its other end bearing against the bottom wall of a relatively deep socket 122 formed in the rear end of the shaft 104. The spring thus serves to normally urge the shaft 104 forwardly and cause the thrust washers 112 to be compressed. An oil seal 123 is seated within an annular recess 124 provided in the front end face of the hub portion 83 of the casing section 82.

The turbine member 108, and consequently the fluid coupling as a whole, is rotatably supported on the mounting flange or plate 38 by means of the aforementioned shaft 54 which projects into a relatively deep socket 130 formed in the turbine shaft 104 and is anchored therein by means of a set screw 132. The shaft 54 thus constitutes an extension of the turbine shaft 104 and it also constitutes the output shaft of the fluid coupling 16, as well as of the assembly 10 as a whole. The shaft 54 is rotatably supported in the mounting plate 38 by means of an antifriction bearing assembly including an outer race or sleeve 134 which is pressfitted within the central opening 46. The bearing assembly is of the type wherein the axial thrust of the shaft 54 is assimilated by the ball elements 136 which travel in annular grooves 138 formed in the shaft 54.

The casing section 54 is provided with a filling opening 140 through which oil may be introduced into the fluid coupling. The opening 140 is provided with a removable filler plug 142. A protuberance 144 counterbalances the mass of excess metal associated with the formation of the filling opening 140. A series of cooling vanes 146 are formed on the outside of the casing section 84 as is conventional in connection with fluid couplings of the type under consideration.

From the above description it will be appreciated that the fluid coupling 16, together with its mounting structure including the outer shell or housing 60, the C-face type mounting plate 38, and the shaft and bearing arrangement by means of which the fluid coupling is supported from the mounting plate 38 constitutes a commercially practical structure which may be sold in an assembled condition as a package-type unit adapted to be connected by the consumer to any one of a wide variety of electric motors having C-face mounting flanges or plates such as the mounting flange 22, and to any one of a wide variety of driven components having C-face mounting flanges or plates such as the plate 36. It is to be noted that, apart from its specific mounting facilities, the assembly 10 is possessed of advantageous features which are not present in connection with conventional three-component assemblies designed for the same purpose and wherein the driving and driven components are mounted on a common base with the fluid coupling suspended therebetween and supported solely by its rotary connections to such components.

Among these features are the total enclosure of the fluid coupling within the confines of the shell 60 so that the rotating coupling is protected from inadvertent contact with adjacent objects while at the same time personnel in the vicinity of the installation are protected from contact with the coupling. An important advantage of the assembly 10 resides in the free floating nature of the two supported components, i.e., the coupling and housing assembly 16, 18 and the electric motor 12. The shell 60 provides a large diameter tubular connector between the frames of the electric motor and the gear reduction unit which holds these two components in accurate alignment and the arrangment is such that there are no other external connections to the motor frame which are capable of destroying such alignment. Moreover, the rigidifying effect of the tubular connector or shell 60 is effective at regions close to the motor and gear reduction unit hubs so that maximum stabilization of the rotating parts is attained.

While the housing 18 has been shown and described herein as being equipped with C-face mounting means at the opposite ends thereof and conforming to National Electrical Manufacturers Association standards, it is to be distinctly understood that other mounting means at the opposite ends of the shell are contemplated providing, of course, that such mounting means offers the necessary bolting and piloting facilities which are required for operative connection of the shell to driving and driven components having counterpart mounting means associated therewith. The invention is therefore not to be limited to the exact arrangement of parts shown in the accompanying drawings or described in this specification as various changes in the details of construction may be resorted to without departing from the spirit of the invention. Therefore, only insofar as the invention has particularly been pointed out in the accompanying claims is the same to be limited.

Having thus described my invention, what I claim and desire to secure by Letters Patent is:

1. The combination with a driven unit of the type having a frame provided with a first annular mounting flange defining a central opening in which the input shaft of the unit is rotatably journalled, and an electric motor unit of the type having a frame provided with a second mounting flange defining a central opening in which the drive shaft of the motor unit is rotatably journalled, of a composite torque-transmitting unit interposed between said driven unit and motor in torque-transmitting relationship, said assembly comprising a fluid coupling having aligned input and output shafts, and a tubular housing encircling the fluid coupling, third and fourth mounting flanges at the opposite ends of the housing respectively and each defining a central opening, said first and fourth mounting flanges each being formed with a pilot recess of a common predetermined diameter, said second and third mounting flanges each being formed with a pilot protuberance thereon of a diameter conformable to the diameter of said pilot recesses, the first and third mounting flanges and the second and fourth mounting flanges respectively fitting against each other in contiguous relationship, there being bolt holes conforming in number and disposition in all of said mounting flanges with the bolt holes being arranged in aligned pairs in the contiguous mounting plates, clamping bolts projecting through each pair of aligned bolt holes and serving to securely clamp the contiguous mounting plates hard against each other whereby the housing is rigidly connected to the driven unit and the motor is rigidly connected to the housing, means coupling the drive shaft of the motor unit to the input shaft of the fluid coupling, and means coupling the output shaft of the fluid coupling to the input shaft of the driven unit, said output shaft of the fluid coupling being rotatably journalled in the central opening in said third mounting flange and being held against axial shifting with respect to such flange whereby, in the detached condition of the torque-transmitting unit, the fluid coupling is supported within the housing solely by said third mounting flange.

2. The combination set forth in claim 1, wherein the coupling means between the driven shaft of the electric motor and the input shaft of the fluid coupling is in the form of a flexible coupling assembly including a first coupling part secured to the impeller in coaxial relationship, and a second mating coupling part secured to the drive shaft in coaxial relationship.

3. The combination set forth in claim 1 and including, additionally, means connected to one of said units establishing a base support therefor whereby the other units are freely supported from said one unit.

References Cited

UNITED STATES PATENTS

| 2,107,089 | 2/1938 | Swennes | 192—58 X |
| 2,151,146 | 3/1939 | Petry | 64—1 X |
| 2,548,195 | 4/1951 | Chillson | 64—26 |
| 2,641,139 | 6/1953 | Beisner | 74—606 X |
| 2,726,522 | 12/1955 | Gumpper et al. | 64—4 |
| 2,830,801 | 4/1958 | Stratienko et al. | 64—1 X |
| 2,868,031 | 1/1959 | Schumb | 74—606 X |
| 3,301,006 | 1/1967 | Sharp | 64—4 |

HALL C. COE, *Primary Examiner.*